Oct. 6, 1931.          W. H. MANNING          1,826,402
CONSTANT CLEARANCE POPPET VALVE
Filed July 26, 1930      4 Sheets-Sheet 1
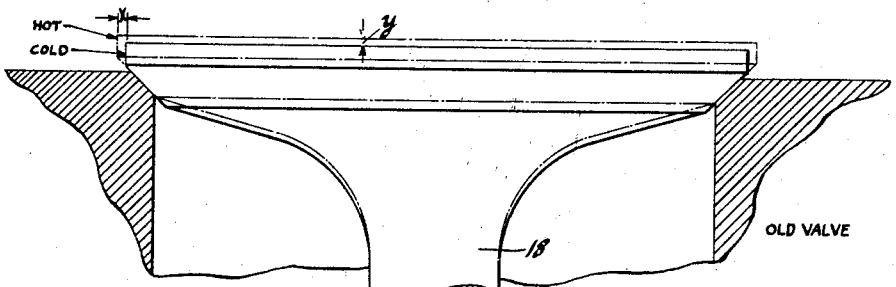
Fig.1
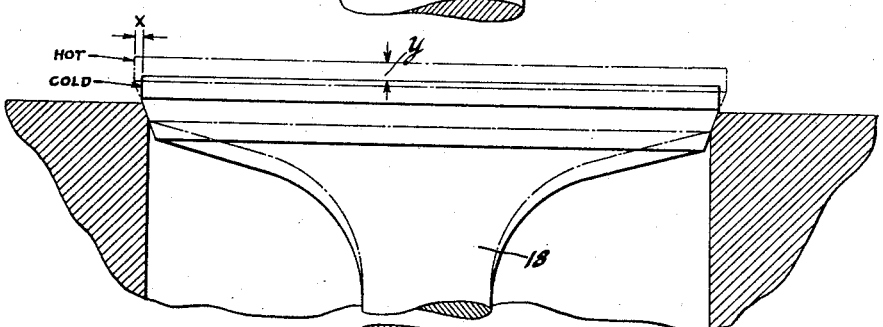
Fig.2
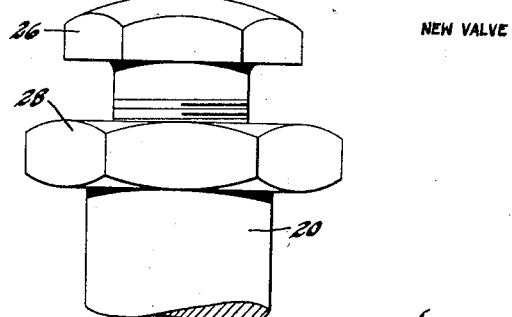
Inventor
William H. Manning
By Blackmore, Spencer & Fluik
Attorneys

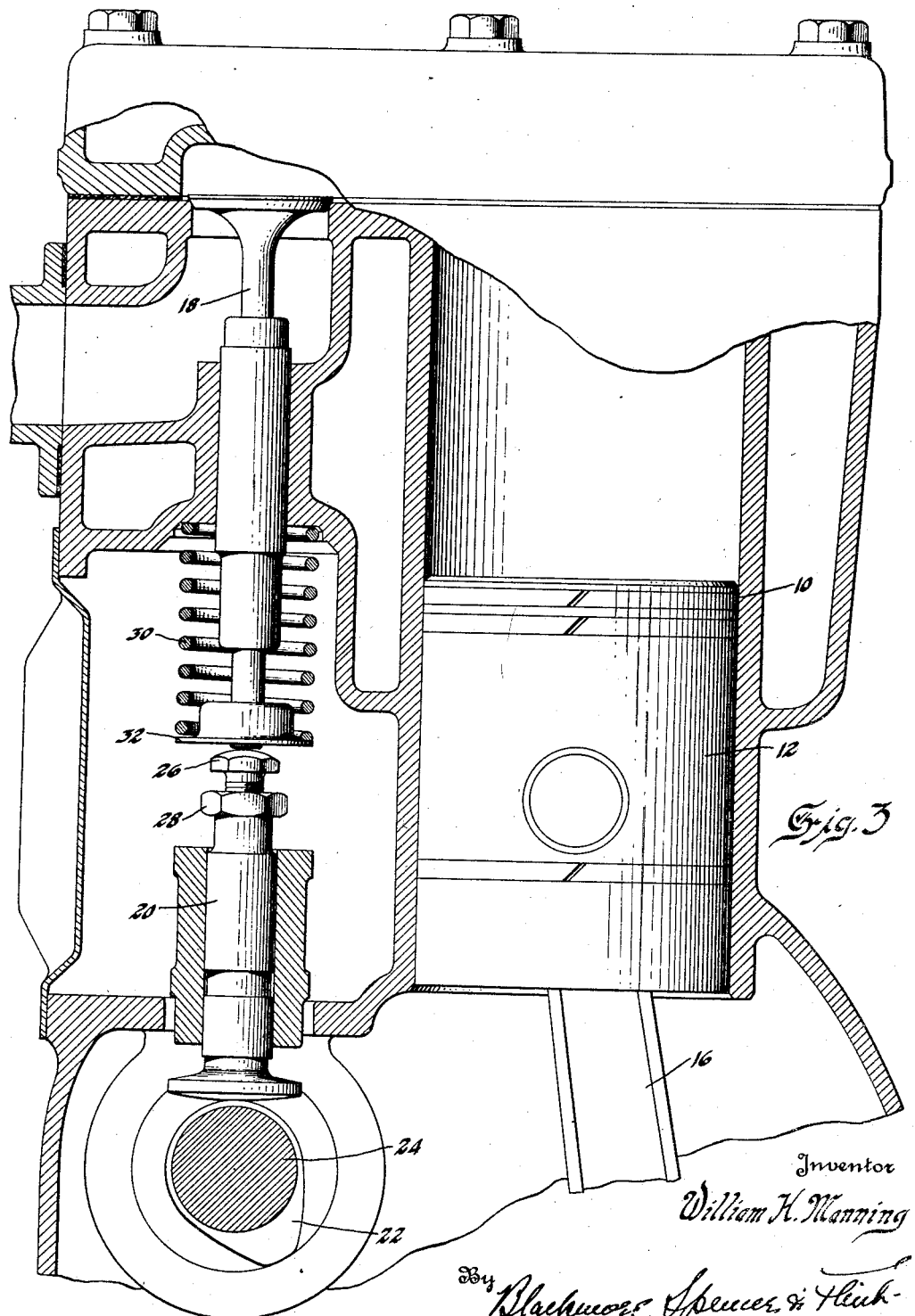

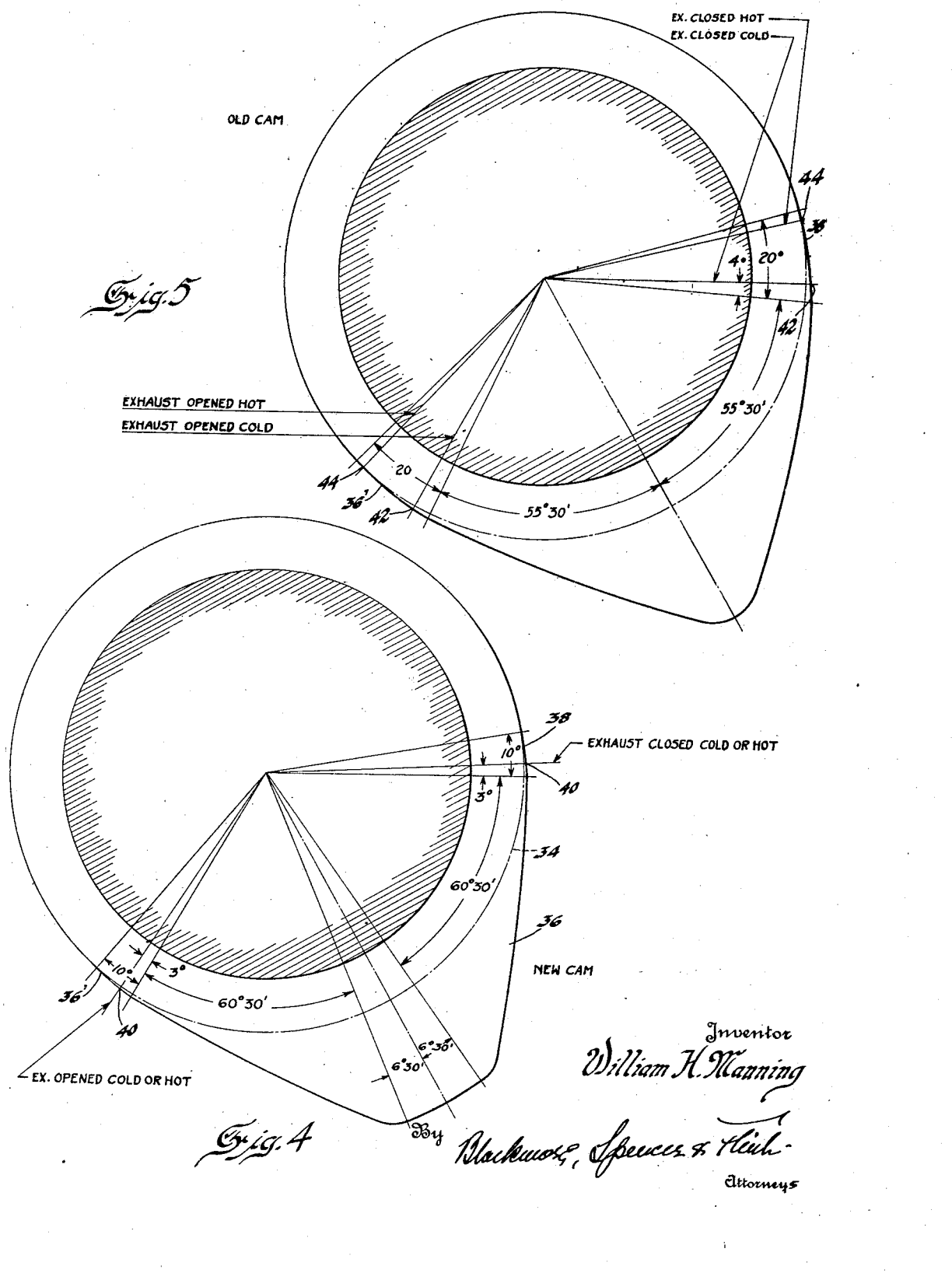

Patented Oct. 6, 1931

1,826,402

UNITED STATES PATENT OFFICE

WILLIAM H. MANNING, OF PONTIAC, MICHIGAN, ASSIGNOR TO GENERAL MOTORS CORPORATION, OF DETROIT, MICHIGAN, A CORPORATION OF DELAWARE

CONSTANT CLEARANCE POPPET VALVE

Application filed July 26, 1930. Serial No. 470,984.

This invention has to do with exhaust valves of the poppet type used in internal combustion engines, and with the operating mechanism therefor.

It is well known that in adjusting valve mechanism of this type clearance must be provided to prevent the valve being held off its seat by expansion of the parts when heated. The clearance decreases as the engine temperature rises. It is dependent in amount at any time upon the complex relations of temperatures operative upon the various members entering into the valve action. The chief factors that determine the resultant variation in clearance are the expansion of the valve, of the push rod, of the cylinder block, of the tappet and of the camshaft.

With the conventional engine the factors tending to decrease clearance as the engine gets hot preponderate over those tending to increase clearance so the result is a net and very substantial reduction in clearance as the engine temperature increases.

In adjusting the valves it is not enough, as a practical matter, to provide just enough clearance to allow for expansion of the parts of the valve gear. The effect of the valve striking its seat with considerable force and great frequency during the operation of the engine, is to cause the valve in time to pound into its seat. An additional amount of clearance should be allowed to take care of this so that as the valve gradually sinks into its seat it is not held off its seat when the engine is hot. Thus, if the variation in clearance due to temperature changes in the engine is .007", an additional two or three thousandths of an inch should be provided to allow for the pound-in that will occur in the next five or six thousand miles of driving. If the valves are adjusted more frequently than this, less allowance is necessary for pound-in; if adjusted less frequently, more allowance is necessary.

The variation in clearance in exhaust valves as a result of engine temperature changes gives rise to noise and loss of power, and shortens the life of the valve and its seat.

The clearance provided when adjusting the valves must, as pointed out above, equal the sum of the variation in clearance resulting from engine temperature changes and the couple of thousandths allowed for pound-in. This total usually amounts to from .006" to .009" in present day engines. In operation the cam strikes the tappet and hurls it against the valve stem, the clearance providing an amount of free movement of the tappet which is sufficient for it to attain sufficient momentum to strike the valve stem with some force. If the tappet is held against the cam shaft by a spring there may be little or no bouncing of the tappet before lifting begins, but if no spring is provided it may be that there is more or less bouncing of the tappet before force is transmitted through it to lift the valve. Obviously the noise is greatest when the clearance is greatest, and the clearance is greatest when the engine is cold. Also, the greater the clearance the greater the impact when the tappet strikes the valve, and when the valve strikes its seat. This results in the valve pounding into its seat more quickly.

The manner in which variation in clearance in conventional valve gear contributes to reduction in power and shortening of the life of the valve and its seat will be made clear in the description of my improved valve operating mechanism which follows.

While the factors producing variation in valve clearance are many and complicated, I have discovered a very simple method of practically eliminating the variation in clearance at no cost whatever. Not only is the variation in clearance eliminated, and with the objectionable valve noise, but I have been surprised to find that with proper design of the cam, which my improvement permits, the engine power is increased and the life of the valve and its seat is lengthened.

My invention consists in providing the valve with a steeper seat angle, so that for a given radial expansion of the head of the valve the valve is raised upwardly a greater distance on its seat. By selecting the proper angle the amount of raising of the valve thus produced and the consequent tendency to increase clearance may be made to equal the tendency to reduce clearance produced by the other factors, so that the net result is substantially zero variation in clearance.

Having succeeded in securing substantially zero variation in clearance in my valve mechanism, I found that this was accompanied by a slight reduction in power, particularly at high engine speeds, probably owing to the reduction in the valve orifice resulting from the use of the higher seating angle. This reduction in power occurred in spite of the fact that with a larger seating angle, a better seal is obtained. Upon further study, checked by actual engine tests, I found that by changing the cam design in a way now permitted by the zero clearance variation, not only was the reduction in power overcome, but an actual increase in power at most engine speeds was achieved, and, in addition, longer life for the valves and seats and less pound-in. This was accomplished by a radical reduction in the lengths of the ramps or easement curves provided on the ends of the cam. The ramps connect the cam and the base circle, and are so laid out that the tappet is moved very slowly at the time it is first pushed upward to take up the clearance, engage the valve and start to lift it. With conventional valve gear the point on the ramp where the clearance has been taken up and lifting begins necessarily varies with the temperature of the parts, since the hotter the parts the less the clearance. Lifting of the valve mechanism will therefore begin sooner when the engine is hot than when it is cold, and vice versa. It is essential for quietness that lifting begin on the ramp where the speed of lifting is low and the impact slight. Therefore the ramp must be made long enough to make sure that the lifting movement begins on the ramp whether the engine is hot or cold. In addition the ramp must be made a little longer to allow for variations in clearance resulting from pounding in of the valve on its seat as previously described. With a long ramp it therefore follows that when the engine is hot the valve starts to open toward the bottom of the ramp and the rate of opening is very slight until it reaches the top of the ramp. This means that at the beginning of the exhaust stroke when the pressure of the exhaust gases in the cylinder is a maximum the valve is raised so slightly off its seat that the discharge of gases is seriously interfered with. Since the burned gases are but poorly swept out of the combustion chamber there is less room for fuel on the next suction stroke and the result is reduction in power. With the valve mechanism designed for operation with practically no variation in clearance, the ramp need be but slightly longer than is necessary to care for the variation in the points of lifting and seating resulting from pound-in, and with the much shorter ramps, the valve is opened much more quickly at the beginnning of the opening movement, and the hot gases, then at maximum pressure, are much more thoroughly swept out, with resultant increase in power.

With valve mechanism designed for substantially no variation in clearance, not only may a shorter ramp be used but the valve will begin to open at the same point on the ramp at all times, aside from the extremely gradual shift due to pound-in. This means that the valve will be opened for the same amount of time whether the engine is hot or cold. With present day valve mechanism with long ramps on the cams, the time the exhaust valve is open is longer the hotter the motor, for the valve begins to open as well as close further down on the ramp. The valve seat is water-cooled and the only way the head of the valve can be cooled is by conduction of heat to the valve seat.

In shortening the ramps I have chosen also to change the valve timing so that the valve opens between the present opening points for hot and cold motor operation, and, similarly, closes between the present closing points. With this timing, made possible by the elimination of variation in clearance, the valve is on the lifting portion of the cam for a longer time and scavenging is thereby improved. The valve is also on its water-cooled seat longer, so that it is better cooled. This results in longer life for the valve and its seat.

Another factor that results in longer life is this: It will be remembered that during the initial opening movement of the exhaust valve in the case of ordinary designs with the long ramp cams, the valve is held but slightly off its seat. The rushing of the hot gases through the narrow crevice thus formed is commonly called "wire-drawing" and causes rapid erosion of the valve and its seat. The quicker initial opening movement of my improved valve mechanism reduces erosion from "wire-drawing" of the escaping gases.

In Figures 1 and 2 of the drawing I have illustrated the principle involved in my invention. Figure 1 is an enlarged view showing a conventional poppet valve with a 45° seat angle, with a dotted line showing of the effect on the position of the valve of a given amount of radial expansion of the head. Figure 2 is a similar view showing the effect of the same radial expansion on the position of my improved exhaust valve provided with a much larger seating angle. The views are exaggerated to better illustrate the idea.

Figure 3 is a section through a conventional engine in which my improved valve gear is incorporated.

Figure 4 is an enlarged view showing the new design of cam embodied in my improved valve gear, the showing likewise being exaggerated for purposes of illustration.

Figure 5 shows, by way of contrast, a conventional cam design.

Figure 6:
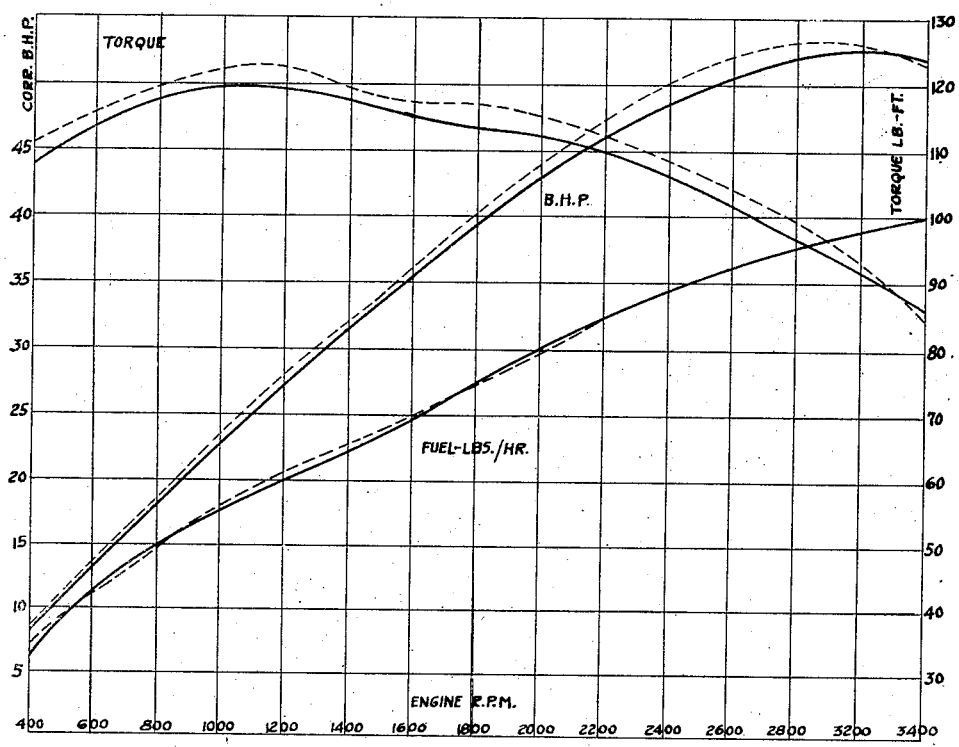
Figure 6 shows the performance curves of an engine equipped with my improved valve gear compared with the same curves for the same engine with conventional valve gear.

Referring first to Figure 3, I have shown a portion of a conventional L-head internal combustion engine, provided with a cylinder 10, piston 12, crankshaft, not shown, and connecting rod 16 connecting the piston to the crankshaft. At 18 I have shown one of the exhaust valves, of the poppet type, actuated by a tappet 20, which is in turn actuated by cam 22 on camshaft 24. Into the tappet 20 is threaded adjusting screw 26, adapted to be locked in position by lock nut 28. By manipulating the screw 26 the clearance in the valve gear may be varied. Spring 30 reacting against the engine block and collar 32 fixed to the valve stem, normally holds the valve 18 on its seat.

In Figure 2 I have shown the valve 18 and its seat on an enlarged scale. It will be noted that the valve seat angle is much greater than the conventional 45° shown in Figure 1. It is here shown as approximately 72°. The exact value of the angle will vary with the thermal conditions and the design and type of valve gear used in the particular engine. However in each case the angle will be considerably greater than 45° and will be so chosen as to substantially cancel out the resultant effect of the expansion of the other parts of the valve gear, producing substantially zero variation in clearance throughout the temperature range.

It will be apparent from an inspection of Figures 1 and 2 that for a given radial expansion $x$, the valve is shifted bodily upward a much greater distance $y$ with the 72° valve seat angle of Figure 2 than with the 45° valve seat angle of Figure 1.

In ascertaining the proper angle to use with a given engine, direct computation is out of the question because of the complexity of the problem. While it is possible to find out the right angle by the "cut and try" method, I have found the following procedure to be the simplest and best.

Two runs are made with the same engine under identical conditions, except that valves and valve seats with different seat angles are employed. In each case variation in valve clearance is measured.

For two runs in which the only change is in valve seat angle it may be assumed that the variation in clearance caused by the expansion of camshaft, tappet, valve stem, and cylinder block will be identical for like loads and speeds. A further assumption which may be questioned is: That since the expansion of the valve seat in the cylinder block is small, due to the comparatively small changes in temperature and the "backing" of large quantities of metal at approximately block water temperature, it may be neglected in preliminary calculations. For accurate analysis, however, a correction factor may be developed to offset this small discrepancy. Therefore let $h$ = lift of valve relative to seat resulting from radial expansion of head.
$e$ = the algebraic sum of the other factors affecting changes in clearance.

The results of two test runs of the same engine first with 30° exhaust valve seats and then with 45° seats were as follows:

Clearance variation motor cold to motor hot at 3200 R. P. M. full load with 30° valve seat angle - -.009

Clearance variation motor cold to motor hot at 3200 R. P. M. full load with 45° valve seat angle - -.007

Now since the total clearance variation is the algebraic sum of all of the factors affecting change in clearance:

$$h_{30} + e = -.009$$
$$h_{45} + e = -.007$$

(1) Subtracting, $h_{30} - h_{45} = -.002$

Now, in general $h$ = amount of radial expansion of head × tangent of valve seat angle. In the two test runs the amount of radial expansion of the head was the same, so that $$\frac{h_{30}}{h_{45}} = \frac{\tan 30°}{\tan 45°} = .5774$$

(2) Therefore $h_{30} = .5774 h_{45}$

Substituting this value of $h_{30}$ in Equation (1)

$$.577 h_{45} - h_{45} = -.002$$
$$h_{45} = \frac{-.002}{.577 - 1} = .00473$$

Since the variation in clearance with a 45° valve seat is .007, in order to attain zero variation in clearance by change in valve seat angle, $h$ must equal $.00473 + .007 = .01173$. To find the valve seat angle with which $h = .01173$, it is simply necessary to remember that $h$ varies with the tangent of the angle. Hence, $$\frac{h_x}{h_{45}} = \frac{.01173}{.00473} = \frac{\tan x}{\tan 45°}$$
$$\therefore \tan x = \frac{.01173}{.00473} = 2.48$$
$$x = 68°$$

Since in the foregoing calculations the change in clearance due to expansion of the valve seat in the block, although small, is unaccounted for, the 70° valve seat angle is judged to be proper for the above case.

By the above method the proper seat angle to obtain zero variation in clearance may be ascertained for any type of engine. In general, the proper valve seat angle for conventional engines will range between 55° and 80°.

To obtain the best results in utilizing my invention I have found it essential to employ with my valve gear, a cam having the general design illustrated in Figure 4. Here the base circle is represented by the line 34, the cam by the line 36 and the ramps by the lines 36 and 38. I have exaggerated the inclination of the ramps for purposes of illustration. I have indicated at 40 the lifting and seating points on the ramps for the initial setting. The space on the ramps between the base circle and the points 40 indicate the allowance for pound-in,—in this case .0035. It will be noted that the ramp occupies but 10° on the cam outline, and that the valve opening occupies approximately 60°. By way of contrast I have illustrated in Figure 5 the conventional production cam design used with the same engine. Here it will be noted that there is an interval of 14° between the point of valve opening when cold, numbered 42, and the point of valve opening when hot, numbered 44, this variation corresponding to the .007″ variation in clearance existing in this engine. It will also be noted that the ramps 36′ and 38′ each occupy 20° on the cam outline, and that the valve opening portion of the cam occupies approximately 55°.

Contrasting my improved cam design shown in Figure 4 with the conventional cam design shown in Figure 5, it will be noted: First, with my design the valve begins to open at the same point on the ramp regardless of temperature variations. Second, the valve is opened more quickly. Third, the valve is maintained open for a longer time,— in the instance shown during an additional interval corresponding to 10° of camshaft rotation. Fourth, the valve is on its seat longer, that is, during an additional interval corresponding to 10° of cam shaft rotation. Obviously, the gain made by the reduction in the length of the ramp may be used otherwise than as shown on Figure 4. Thus the period of valve opening might be made less or greater than shown, with corresponding changes in the position of the ramp.

In tests of an engine with a valve seat angle of 72° calculated as described, and with the cam design as illustrated in Figure 4 I have obtained the following results:

(1) Valves when new held pressure much more effectively than the standard 45° valves. This characteristic has been retained throughout many hundreds of miles of road testing.

(2) In operating at full loads from 0 to 3200 R. P. M. there was zero variation in clearance. The maximum variation in clearance at car driving loads from 0 to 3200 R. P. M. was .0002″.

(3) Increased power was secured throughout substantially the entire range of engine performance.

In Figure 6 I have reproduced a set of comparative performance curves of the same engine operated with 45° and with 72° valve seat angles. From these curves other advantages of my invention will be apparent.

My invention is susceptible of a great deal of variation in practice. It is applicable to all types of internal combustion engines in which poppet valves are employed. The exact valve seat angle will vary with the design of engine and type of valve gear, but as previously pointed out will, in general, fall between approximately 55° and 80°. Many of the good results may be obtained by resorting to very small variation in clearance, say of the order of plus or minus one or two thousandths, and it is to be understood that I have in mind such variations in using the expression "approximately zero variation in clearance." My invention may also be used in combination with changes in others of the factors entering into the variation in clearance enumerated above, either to assist or oppose the effect produced by change in valve seat angle. For example the clearance can be increased with increase in temperature by using for the head, material having a higher coefficient of expansion; by using a shorter valve stem or by using valve stems having lower coefficients of expansion; by using longer cylinder blocks, or blocks of material having a higher coefficient of expansion. The same result would also be secured by running the valve heads and cylinder blocks at higher temperatures, or providing for better cooling of the valve stem if these changes can be effected without altering the temperature of the other parts.

The design of cam may be changed as suggested above, but in general my invention is characterized by the employment of a ramp of sufficient length to care for pound-in only, and this will, in general, be in the neighborhood of 10°, and will take care of a "pound-in" clearance of from two to four thousandths.

I claim:

1. An internal combustion engine comprising an engine block having a combustion chamber, an exhaust valve of the poppet type for the chamber, a seat for the valve, mechanism for operating valve, the seating angle of the valve being such that the upward movement of the valve on its seat as a result of expansion of the head of the valve is sufficient to compensate for the effects of expansion of the block and operating mechanism to give substantially fixed or zero variation in lash.

2. An internal combustion engine provided with an exhaust valve of the poppet type and a seat therefor, and means for operating said valve, the valve seat angle being substantially greater than 45° and being such as to provide substantially zero variation in clearance throughout the engine temperature range.

3. An internal combustion engine provided with an exhaust valve of the poppet type and a seat therefor, and means for operating said valve including a camshaft, and a tappet, said parts being adjusted to provide clearance to allow for pound-in of the valve, the valve seat angle being substantially greater than 45° and being such as to provide substantially zero variation in clearance throughout the engine temperature range.

In testimony whereof I affix my signature.

WM. H. MANNING.